United States Patent
Lebowsky et al.

(10) Patent No.: US 8,457,436 B2
(45) Date of Patent: Jun. 4, 2013

(54) METHOD FOR PROCESSING A DIGITAL IMAGE, IN PARTICULAR FOR PROCESSING CONTOUR REGIONS, AND CORRESPONDING DEVICE

(75) Inventors: Fritz Lebowsky, Saint Martin d'Uriage (FR); Yong Huang, Singapore (SG)

(73) Assignees: STMicroelectronics SA, Montrouge (FR); STMicroelectronics Asia Pacific Pte Ltd., Singapore (SG)

( * ) Notice: Subject to any disclaimer, the term of this patent is extended or adjusted under 35 U.S.C. 154(b) by 646 days.

(21) Appl. No.: 12/161,243

(22) PCT Filed: Jan. 17, 2007

(86) PCT No.: PCT/FR2007/000082
§ 371 (c)(1),
(2), (4) Date: Feb. 15, 2011

(87) PCT Pub. No.: WO2007/083019
PCT Pub. Date: Jul. 26, 2007

(65) Prior Publication Data
US 2011/0129146 A1    Jun. 2, 2011

(30) Foreign Application Priority Data
Jan. 17, 2006    (FR) ...................................... 06 00411

(51) Int. Cl.
*G06K 9/40*    (2006.01)
(52) U.S. Cl.
USPC ........... 382/266; 382/260; 382/274; 382/275; 358/3.26; 358/3.27; 358/463

(58) Field of Classification Search
USPC ................. 382/260, 266, 274, 275; 358/3.26, 358/3.27, 463
See application file for complete search history.

(56) References Cited

U.S. PATENT DOCUMENTS

| | | | | |
|---|---|---|---|---|
| 6,847,738 | B1 * | 1/2005 | Scognamiglio et al. | 382/260 |
| 7,426,312 | B2 * | 9/2008 | Dance et al. | 382/254 |
| 7,684,611 | B2 * | 3/2010 | Simpkins | 382/145 |
| 7,738,699 | B2 * | 6/2010 | Tsuruoka et al. | 382/169 |
| 7,764,829 | B2 * | 7/2010 | Petrich | 382/154 |
| 2002/0140854 | A1 | 10/2002 | Lan | 348/448 |

OTHER PUBLICATIONS

Rieder P. et al., "New concepts on denoising and sharpening of video signals," International Conference on Consumer Electronics. 2001 Digest of Technical Papers. ICCE. Los Angeles, CA, Jun. 19-21, 2001, pp. 188-189.

* cited by examiner

*Primary Examiner* — Yosef Kassa
(74) *Attorney, Agent, or Firm* — Allen, Dyer, Doppelt, Milbrath & Gilchrist, P.A.

(57) ABSTRACT

A method of processing a digital image which includes at least one contour zone, including a contour zone sharpness processing. The sharpness processing includes a conversion of the cues regarding level of pixels of the contour zone into initial main cues, lying between zero and a main value dependent on the amplitude of the contour, a sharpness sub-processing performed on these initial main cues so as to obtain final main cues, and a conversion of the final main cues into final cues regarding levels.

15 Claims, 16 Drawing Sheets

|  | CA(min) | CA(n) | CA(n)1 | CA(n)2 | CA(max) |
|---|---|---|---|---|---|
| STEP 2 | 0 |  | 0.65 |  | 1 |
| STEP 3 GAIN=3 | 0 | 1.95 |  |  | 1 |
| STEP 4→8 m=1 | 0 | 1.95 | 1 |  | 1 |
| STEP 5→8 m=2 | 0 | 1.95 | 1 | 0 | 1 |
| STEP 9 | 0 | 0.95 | 1 | 0 | 1 |
| STEP 10 | 0 | 0 | 0.95 | 1 | 1 |

FIG. 6

|  | CA(max) | CA(n) | CA(n)1 | CA(n)2 | CA(n+1) | CA(n+1)1 | CA(n+1)2 | CA(min) |
|---|---|---|---|---|---|---|---|---|
| STEP 2 | 1 |  | 0.85 |  |  | 0.35 |  | 0 |
| STEP 3 GAIN=3 | 1 | 2.55 |  |  | 1.05 |  |  | 0 |
| STEP 4→8 m=1 | 1 | 2.55 | 1 |  | 1.05 | 1 |  | 0 |
| STEP 5→8 m=2 | 1 | 2.55 | 1 | 1 | 1.05 | 1 | 0 | 0 |
| STEP 9 | 1 | 0.55 | 1 | 1 | 0.05 | 1 | 0 | 0 |
| STEP 10 | 1 | 1 | 1 | 1 | 0.55 | 0.05 | 0 | 0 |

FIG. 7

|  | CA(max) | CA(n) | CA(n)1 | CA(n)2 | CA(n+1) | CA(n+1)1 | CA(n+1)2 | CA(min) |
|---|---|---|---|---|---|---|---|---|
| STEP 2 | 1 |  | 0.85 |  |  | 0.35 |  | 0 |
| STEP 3 GAIN=3 | 1 | 3.6 |  |  |  |  |  | 0 |
| STEP 4→8 m=1,2 | 1 | 3.6 | 1 | 1 |  |  |  | 0 |
| STEP 5→8 m=3,4,5 | 1 | 3.6 | 1 | 1 | 1 | 0 | 0 | 0 |
| STEP 9 | 1 | 0.6 | 1 | 1 | 1 | 0 | 0 | 0 |
| STEP 10 | 1 | 1 | 1 | 1 | 0.6 | 0 | 0 | 0 |

FIG. 9

|  | CA(max) | CA(n) | CA(n+1) | CA(min) |
|---|---|---|---|---|
| STEP 2 | 1 | 0.85 | 0.35 | 0 |
| STEP 3 GAIN=1 | 1 | 1.2 |  | 0 |
| STEP 4→8 | 1 | 1.2 | 1 | 0 |
| STEP 9 | 1 | 0.2 | 1 | 0 |
| STEP 10 | 1 | 1 | 0.2 | 0 |

FIG. 10

METHOD FOR PROCESSING A DIGITAL IMAGE, IN PARTICULAR FOR PROCESSING CONTOUR REGIONS, AND CORRESPONDING DEVICE

FIELD OF THE INVENTION

The invention relates to the processing of digital images, in particular the processing of the contour zones of the image to improve the sharpness thereof.

The invention applies advantageously but not limitingly to the processing of the effects of blur of a given image, for example by an implementation within a blur-processing software tool.

The invention also applies advantageously but not limitingly to applications using a modification of the digital image, employing for example a procedure of linear processing of a sampled digital signal, such as a modification of the size of the image by linear interpolation.

The invention can be applied in particular, in respect of the displaying of digital images on large-size screens, such as plasma screens or LCDs. For example, to display an image initially in the VGA (Videographics Adapter) format of dimensions 640×480, on a screen accepting a broadcasting format of HDTV type, of dimensions 1920×1080, a vertical and horizontal magnification of the image is necessary.

BACKGROUND OF THE INVENTION

In the case of digital video applications, it is often helpful to redimension it as a function of the display norm used. These redimensionings may impair the sharpness of the contour zones, and hence the quality of the image displayed.

Conventionally, to limit the visual artifacts impairing the contours of the processed image, in particular owing to the approximations stemming from the use of a linear procedure, a post-filtering (for example to perform a sharpness processing as described in U.S. Pat. No. 6,847,738 in the name of Philips) can be carried out, in particular at the level of the contour zones.

However, a post-filtering may attenuate one type of artefact (for example the appearance of halos, with the aid of a linear compensation filter) but accentuate another type.

Furthermore, the use of an extra filter adds constraints on the aperture of the signal sampling window, which may not be as narrow as desired, thereby accentuating the degradation of the processed image.

SUMMARY OF THE INVENTION

An aim of the invention is to improve the sharpness of the contours, in particular after it has been processed digitally.

For this purpose, according to an aspect there is a method of processing a digital image which has at least one contour zone, comprising a contour zone sharpness processing.

According to a general characteristic of this aspect, the sharpness processing comprises a conversion of the cues regarding level of pixels of the contour zone into initial main cues, lying between a minimum value, for example zero, and a main value dependent on the amplitude of the contour, a sharpness sub-processing performed on these initial main cues so as to obtain final main cues, and a conversion of the final main cues into final cues regarding levels.

According to an embodiment, the main value corresponds to the amplitude of the contour, that is to say to the deviation between the maximum amplitude of a pixel and the minimum amplitude of another pixel.

This embodiment has the advantage of reducing the number of operations to be performed.

Preferably, the main cue is normalized, and corresponds to the contour amplitude divided by this same amplitude. The main cue therefore has a unit value.

More particularly there is proposed a method of processing a digital image which has at least one contour zone, comprising a step of processing the contour zones.

The step of processing the contour zones comprises for each contour zone processed and for a set of chosen pixels, a first step of converting the cue regarding level of the pixels into a main cue, a step of processing this main cue dependent on the processing of the image, so as to obtain a new main cue, and a second step of converting the new main cue into another cue regarding level of the pixel.

Stated otherwise, the cues regarding level or amplitude of the pixels are converted into a main cue, in particular normalized for which a set of operations which are specific thereto is defined.

Specifically, determining a main cue of the pixel, corresponds to determining a cue for the pixel phase. The latter being a periodic function possessing very specific properties.

In particular, each image transformation may give rise to a modification of the phase that is easily identifiable, which has the advantage of not generating substantial loss of information, contrary to the operations performed on the amplitude of the pixels, by the current linear procedures for processing contours, owing to the approximations that are made.

Consequently, to process the contour zones of the image, this approach adopts a different method from the existing procedures, since the processing operations are performed not on amplitudes, but on values of phase.

According to a mode of implementation, the sharpness sub-processing comprises for each pixel situated interior to the contour zone, the determination of an intermediate cue, and the subtraction of this intermediate cue from the maximum initial main cue, so as to obtain the final main cue.

According to a mode of implementation, the step of processing the contour zones comprises the detection of the contour zones in the initial digital image, by locating for each dimension of the initial digital image, the level cue values, for example the minimum and maximum local amplitudes of the pixels, the succession of two pixels having respectively a minimum and maximum amplitude conveying the existence of a contour zone.

According to a mode of implementation, the main quantity is formed from the deviation between the cues regarding maximum and minimum level of two successive pixels delimiting the said contour zone.

According to a mode of implementation, the step of conversion comprises, for each contour, the normalization of the values of the minimum and maximum cues regarding level of the pixels delimiting the said contour, and pixels of the contour zone, as a function of the deviation between the cues regarding maximum and minimum level of two successive pixels.

According to a mode of implementation, the processing step may be performed, furthermore, on the sum of the main cues of the set of pixels strictly interior to the contour zone.

According to a mode of implementation, the phase of processing of the contours may comprise the generation of subpixels interior to the contour zone.

According to another mode of implementation, the digital image may be a colour image, for example an image comprising three components according to the RGB format. During this mode of implementation, for each contour, the amplitude of the contour is determined on the basis of the contour of each component of the colour image, and the conversions and the sub-processing of the contour zone sharpness processing is performed for each component of the colour image.

The advantage of this mode of implementation Is to minimize the appearance of noise on the contours and to reduce the phase errors at the level of the contours.

For example, according to the aforesaid mode of implementation, it is possible to determine the amplitude of the contour, while also taking account of the direction of variation of the contour of each component.

More precisely, the determination of the amplitude may comprise for each contour a multiplication of the contour of each component of the image by the associated direction of variation, an addition of the multiplied contour of the components of the image so as to obtain a modified contour, and the calculation of the amplitude of the contour by differencing the value of the level information cue taken by the modified contour at the start of the contour and the value of the level information cue taken by the modified contour considered at the end of the contour.

According to another aspect, there is a device for processing a digital image which has at least one contour zone, comprising means or circuitry of contour zone sharpness processing.

The sharpness processing means or circuitry comprise first conversion means or circuitry able to convert cues regarding level of pixels of the contour zone into initial main cues, lying between zero and a main value dependent on the amplitude of the contour, means or circuitry of sharpness sub-processing able to perform a sharpness processing on these initial main cues so as to obtain final main cues, and second conversion means or circuitry able to convert the final main cues into final cues regarding levels.

More particularly, there is a device for processing a digital image which comprises at least one contour zone, comprising means or circuitry of processing of the contour zones.

The means or circuitry of processing of the contour zones comprise first conversion means or circuitry able, for each contour zone processed and for a set of chosen pixels, to convert the cue regarding level of the pixels into an initial main cue, means or circuitry of processing able to process this initial main cue as a function of the processing of the image, so as to obtain a new main cue, and second conversion means or circuitry able to convert the new normalized cue into another cue regarding level of the pixel.

According to an embodiment, the means or circuitry of sharpness sub-processing comprise means or circuitry of determination able, for each pixel situated interior to the contour zone, to determine an intermediate cue, and subtraction means or circuitry able to subtract this intermediate cue from the maximum initial main cue, so as to obtain the said final main cue.

According to another embodiment the digital image may be a colour image, in particular an image comprising three components according to the RGB format. In this case, the contour zone sharpness processing means or circuitry (MTRC) furthermore may comprise means or circuitry for determining the amplitude of the contour (MCamplRGB) able to determine the amplitude of the contour on the basis of the contour of each component of the colour image. The first and second conversion means or circuitry, and the sharpness sub-processing means or circuitry are able to operate on each component of the colour image.

For example, the means or circuitry for determining the amplitude of the contour (MCamplRGB) are able to determine the amplitude of the contour while also taking account of the direction of variation of the contour of each component.

More precisely, the means or circuitry for determining the amplitude of the contour may comprise multiplication means or circuitry able to perform a multiplication of the contour of each component of the image by the associated direction of variation, addition means or circuitry able to add the multiplied contour of the components of the image so as to obtain a modified contour, and means or circuitry for calculating the amplitude of the contour able to difference the value of the level information cue taken by the modified contour at the start of the contour and the value of the level information cue taken by the modified contour considered at the end of the contour.

According to another aspect, there is a display system, in particular a plasma screen, comprising a device such as mentioned hereinabove.

These approaches may also be applied to LCD-type screens or to other types of screens.

These approaches may be integrated within a software tool, in particular for the processing of images, for example Adobe Photoshop®.

BRIEF DESCRIPTION OF THE DRAWINGS

Other advantages and characteristics of the invention will become apparent on examining the detailed description of an embodiment of the invention which is in no way limiting and of the appended drawings in which:

FIGS. 6 and 7 illustrate a digital application of the mode of implementation of FIG. 4, FIGS. 9 and 10 illustrate a digital application of the mode of implementation of FIG. 8.

DETAILED DESCRIPTION OF THE PREFERRED EMBODIMENTS

Figure 1:
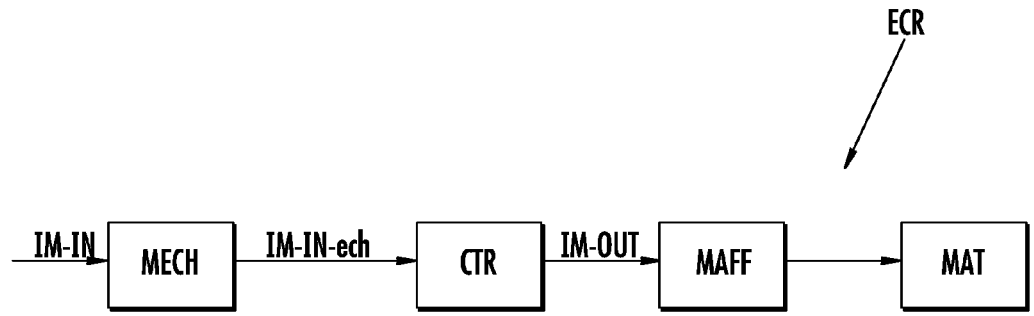
FIG. 1 represents an embodiment of a system according to the invention.

We refer now to FIG. 1. The reference ECR designates a screen, for example a plasma-type screen, comprising a processing chain CTR for a digital image. The latter receives as input a sampled input image IM-IN-ech delivered by sampling means or circuitry MECH on the basis of a digital image IM-IN.

The processing chain CTR delivers as output an image IM-OUT to display means or circuitry MAFF able to display the output image IM-OUT on a display matrix MAT of the screen ECR.

Figure 2:
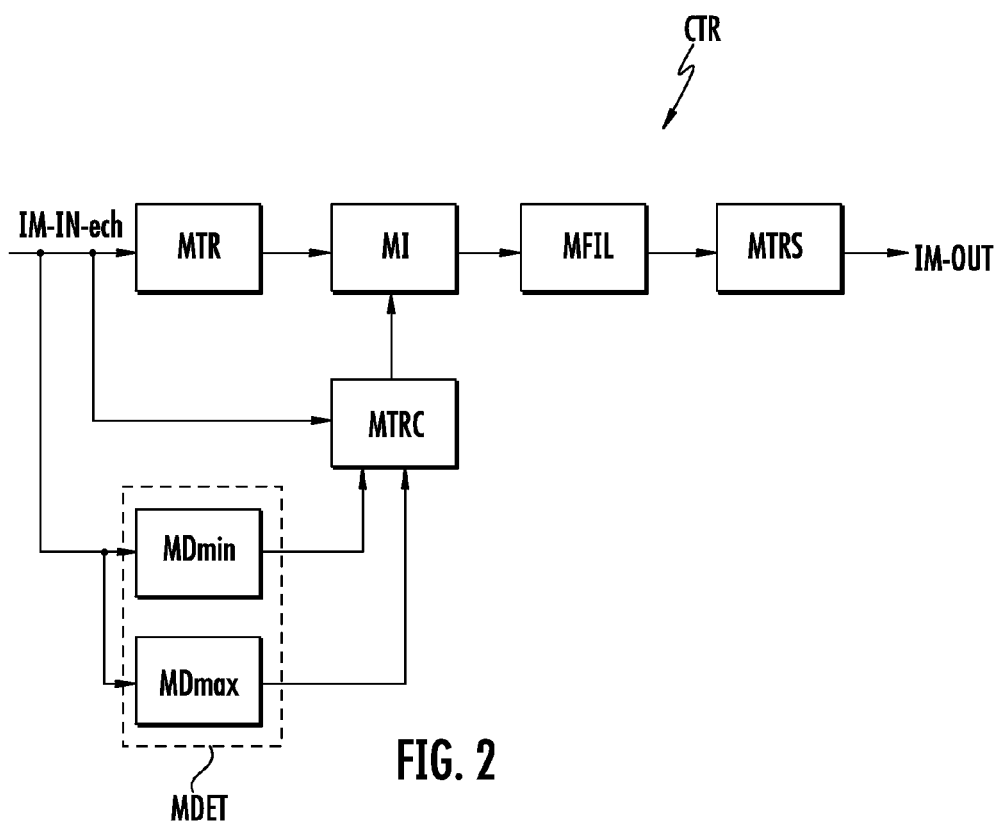
FIG. 2 represents an embodiment of a processing chain according to the invention.

We now refer to FIG. 2 which illustrates an embodiment of the processing chain CTR.

The latter comprises means or circuitry of processing MTR of the digital sampled input image IM-IN-ech.

For example, these means or circuitry of processing may be means or circuitry of magnification or of a reduction of the image, means or circuitry of increasing or of decreasing the resolution of the image, or means or circuitry of processing the effects of blur of the image.

Of course, the processing means or circuitry are not limited to the aforesaid means or circuitry.

The processing chain CTR also comprises circuitry or means of processing of the contours MTRC implementing a method according to the invention.

To do this, the processing chain CTR furthermore comprises circuitry or means of detection of the contours MEET.

The latter receive as input the sampled image IM-IN-ech and calculate for the various dimensions of the image the local minimum and maximum. This detection of minimum and maximum may be performed according to a conventional procedure known per se to the person skilled in the art, for example that described on the site: "http://fr.wikipedia.org/wiki/Extremum_local".

The succession of two pixels having respectively a local minimum and local maximum amplitude (or vice versa) reveals the presence of a contour in the image, that is to say a separation between two distinct zones of the image.

These minimum and maximum local amplitudes are delivered to the means or circuitry of processing of the contours MTRC. They output the processed contours to means or circuitry of insertion MI. The means or circuitry of insertion MI also receive as input the image delivered by the processing means MTR.

The processing chain CTR can also comprise means or circuitry of filtering MFIL, for example image smoothing means or circuitry delivered by the means or circuitry of insertion MI.

Furthermore, the processing means or circuitry may comprise additional means or circuitry of processing MTRS of the image, for example means or circuitry of reducing the image if the processing means or circuitry are magnifying means or circuitry.

The additional means or circuitry of processing deliver as output the image IM-OUT.

Of course, just as for the means or circuitry of processing MTR, the means or circuitry of filtering MFIL and of additional processing of the image MTRS are possible examples of post-processing, given by way of indication.

Additionally, it is possible to utilize directly the image delivered by the means or circuitry of insertion MI.

Figure 3:
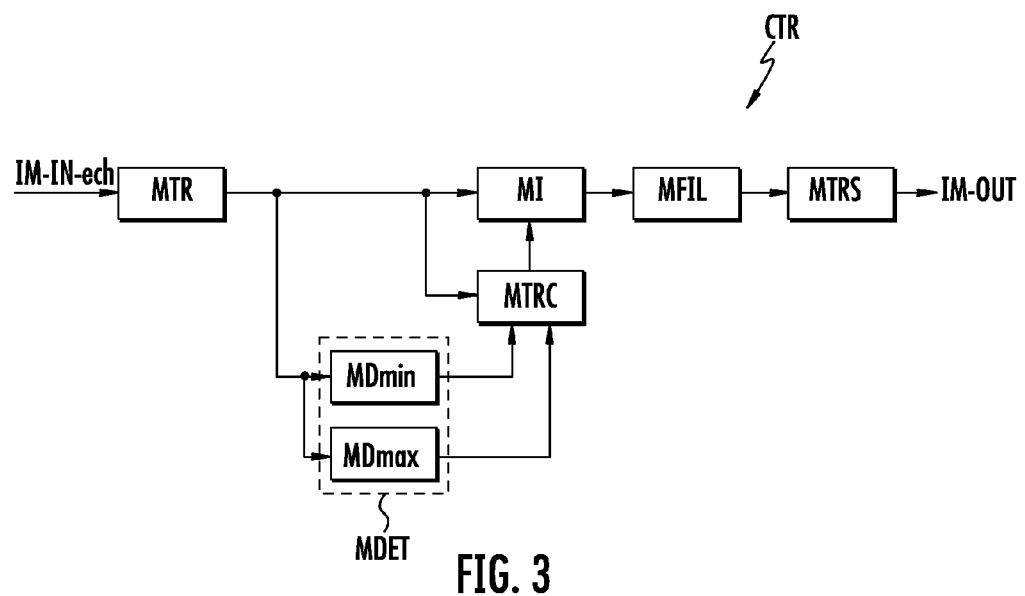
FIG. 3 represents another embodiment of a processing chain according to the invention.

We now refer to FIG. 3 which illustrates another embodiment of the processing chain CTR.

In this example, the means of detection MDET and the means or circuitry of processing of the contours MTRC now receive directly as input the image processed by the means or circuitry MTR rather than the sampled initial image IM-IN-ech.

Specifically, the pixels of the contours of the unprocessed image are indexed by virtue of the conventional addressing procedures well known to the person skilled in the art, which make it possible to reference the pixels of the output image with respect to the input image.

In the rest of the description, unless indicated to the contrary, the main cues which will be mentioned hereinafter are considered to be normalized, that is to say to lie between 0 and 1.

Figure 4:
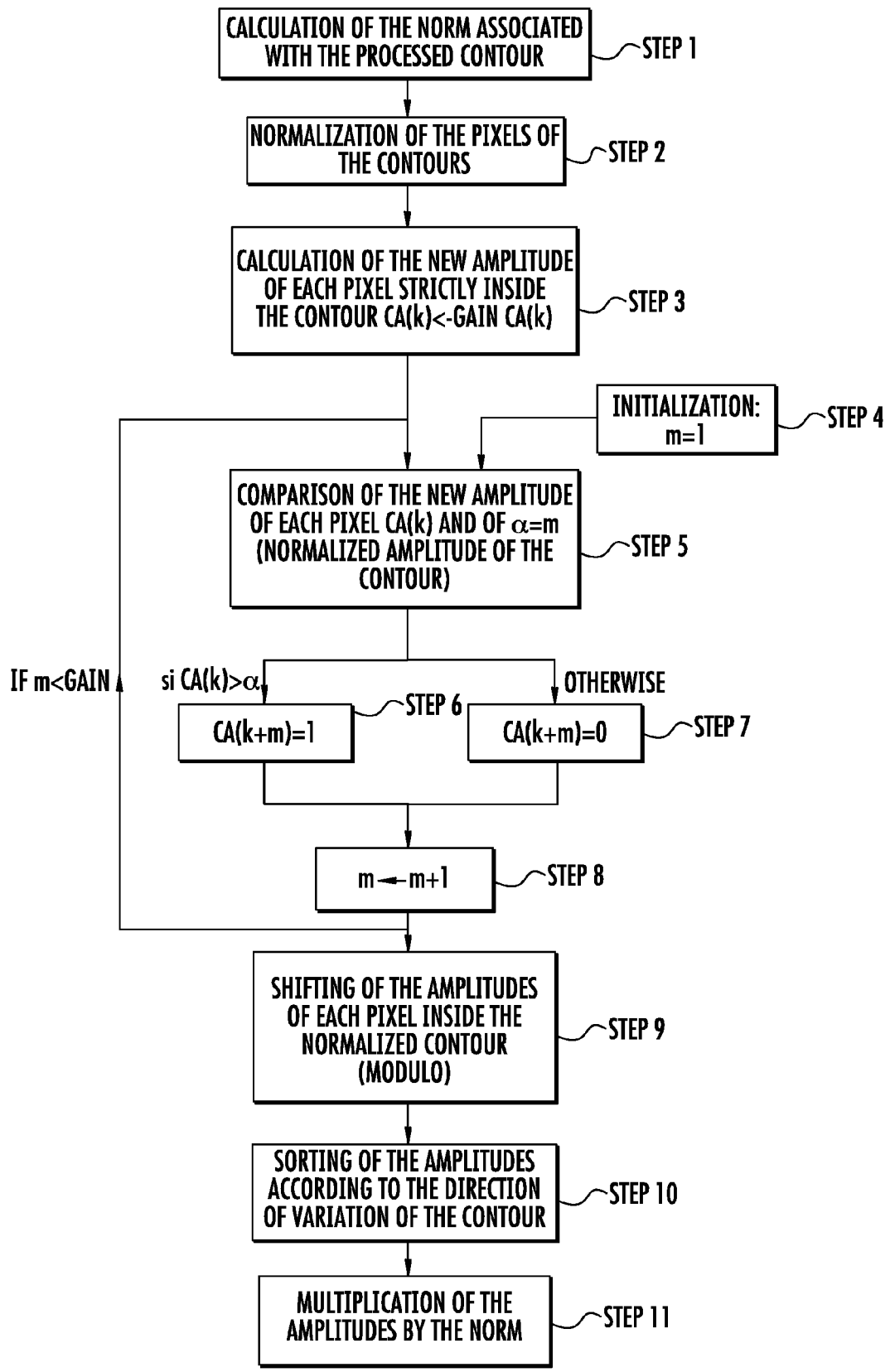
FIG. 4 illustrates a mode of implementation of a method according to the invention.

We now refer to FIG. 4 which illustrates a mode of implementation of the method in the particular case where a magnification of a digital image is performed, or else when the resolution of the image is increased.

The magnification may be performed with an integer or non-integer amplifying factor (or gain).

Each contour is detected according to a dimension of the image, for example a line, a column or another dimension in the case of an image with three dimensions or more.

What will be described now applies for each of the dimensions of the image.

A first step (step 1) includes calculating the norm associated with the contour processed. This norm may be recalculated for each contour processed.

This norm corresponds to the deviation (main value) between the maximum and minimum amplitudes of the pixels delimiting the contour. This deviation is called the amplitude of the contour.

In the course of a second step (step 2), the pixels of the contours are normalized.

This operation amounts, for each pixel of the contour, to subtracting from the amplitude of the said pixel, the minimum value of the pixel limiting the contour, and of dividing the result by the norm calculated in step 1.

This operation is equivalent to the act of calculating a value of phase (initial main cue) for the relevant pixel, according to the relation below:

$$\varphi_{CA}(n) = \frac{CA(n) - CA(\min)}{CA(\max) - CA(\min)} * 2\pi \tag{1}$$

where:

$\phi_{CA}(n)$ represents the phase of the pixel at the position n within the contour, CA(n), CA(min) and CA(max) respectively represent the amplitudes of the contour pixel situated at the position n, of the pixel having the minimum amplitude, and of the pixel having the maximum amplitude.

Figure 5A:
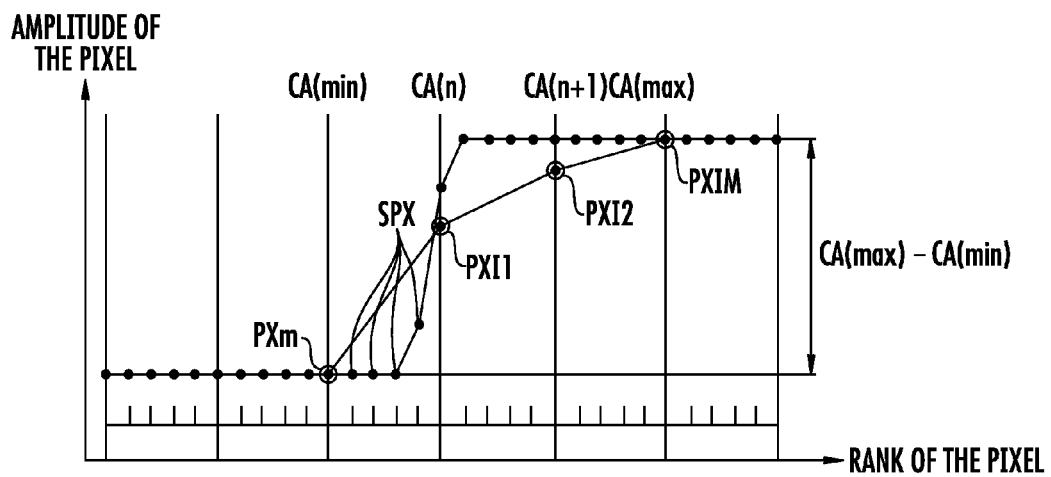
FIG. 5a represents an exemplary contour after a magnification, according to the invention.

FIG. 5a illustrates an exemplary rising contour, comprising a pixel PXm of minimum amplitude, two intermediate pixels PXI1, PXI2, and a pixel PXIM of maximum amplitude. The various amplitudes CA(min), CA(n), CA(n+1) and CA(max) of these pixels are represented by an encircled black point.

The pixels SPX in light grey are those added by the processing (here the magnification) and will be called sub-pixels.

Figure 5B:
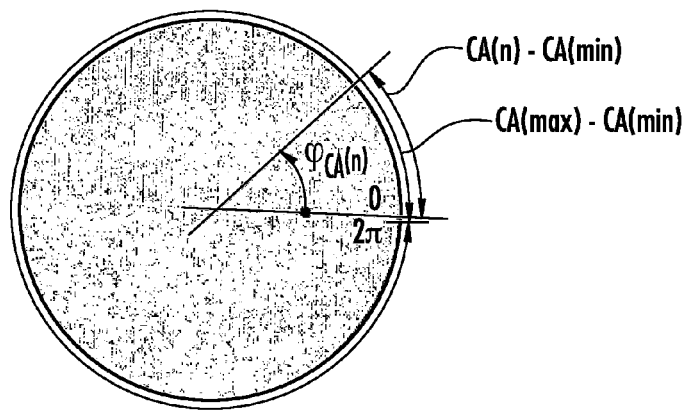
FIG. 5b represents a mode of representation of the normalized amplitudes of the pixels according to the invention.

Additionally, performing the normalized phase/amplitude transformation may be represented on a unit circle as illustrated in FIG. 5b. The amplitude of the contour (CA(max)−CA(min)) corresponds to the circumference of the unit circle, in the associated phase to 2 n. The amplitude CA(n)−CA(min) corresponds to the portion of circle associated with the phase $\phi_{CA}(n)$ We refer again to FIG. 4.

In the course of a step 3, the new amplitude (intermediate cue) of each pixel strictly interior to the contour is calculated, by multiplying its normalized amplitude by the gain G of the magnification.

Specifically, there exists between the phase of a pixel of a given image, and this same pixel in the magnified image, a relation:

$$\phi'_{CA}(n)=G*\phi_{CA}(n) \quad (2)$$

where $\phi'_{CA}(n)$ is the phase of the pixel in the magnified image, and $\phi_{CA}(n)$ is the phase of the pixel of the initial image.

Next, to obtain sub-pixel amplitudes engendered by the magnification of the image (or of the increasing of the resolution), the new amplitude of each pixel CA(k) (k taking successively the value of the index of the pixel processed) is compared (step 5) with a threshold a equal to the amplitude of the normalized contour (that is to say 1, in this case) multiplied by an index m, the latter having been initialized to 1 in the course of a step 4.

If the new amplitude of the pixel CA(k) is greater than the threshold $\alpha$, the value 1 is assigned to the sub-pixel (step 6), and 0 is assigned otherwise (step 7).

In the case where a normalized amplitude is not considered, the amplitude of the contour, that is to say (CA(max)−CA(min)), is assigned to CA(k+m).

The value of m is incremented (step 8) and steps 5 to 8 are repeated so long as m is strictly less than the gain.

During a step 9, the amplitude, that was amplified in the course of step 3, of each pixel is shifted in such a way that it lies interior to the normalized span (here between 0 and 1).

This operation amounts to performing a "modulo" operation on the amplitude CA(k), this being possible owing to the relation between a normalized amplitude and a phase.

Finally, the amplitudes obtained for the whole set of the pixels of the contour and of the sub-pixels are sorted as a function of the direction of variation thereof (step 10).

Finally, the real amplitudes (final cue regarding level) of each pixel and sub-pixel are retrieved by performing the process inverse to step 2 (step 11). Stated otherwise, the values obtained during the previous step are multiplied by the norm, here the amplitude of the contour.

More precisely, for a rising contour, if CA(in) corresponds to the real amplitude of a pixel at the position n interior to a contour, by performing the normalization operation, we obtain:

$$CA(n1) \leftarrow (CA(in)-CA(i1))/\text{contour\_contrast}$$

with contour_contrast=abs(CA(k1)−CA(i1)) and where n1=(i1+1), ..., (k1−1), n1 corresponding to the position of a pixel interior to the relevant contour,
i1<k1, i1 and k1 being two integers correspond to the positions of the pixels having respectively a minimum and maximum amplitude and delimiting the contour,
CA(i1) represents the minimum amplitude of the pixel delimiting the contour, of index i1,
CA(k1) represents the maximum amplitude of the pixel delimiting the contour, of index k1.

The width of the contour l is therefore equal to:

$$l=(k1-i1-1), \text{ in terms of number of pixels.}$$

The new amplitude CA' of the pixel of index n1 in the initial image is equal to:

$$CA'(n1*g)=\text{gain}*(CA(n1)-CA(i1));$$

where:
gain represents the amplifying factor,
g represents the integer part of the gain,
n1*g represents the new index in the processed image of the pixel of index n1 in the initial image.

The amplitude CA" of the sub-pixels which is added by the image processing is determined by the relation:

$$CA''(n1*g+m) = \begin{cases} CA(k1) & \text{if } CA'(n1*g) \geq m^*(CA(i1)-CA(k1)) \\ CA(i1) & \text{if } CA'(n1*g) \geq m^*(CA(i1)-CA(k1)) \end{cases}$$

with $m = 1, \ldots, (g-1)$.

The new amplitude CA(n1) that was multiplied by the gain is shifted in such a way that it lies in the normalized deviation, that is to say that a modulo operation, in terms of phase, is applied:

$$CA''(n1*g)=\text{modulo}(CA'(n1*g),(CA(k1)-CA(i1))+CA(i1),$$

where
CA"(n1*g) designates the normalized amplitude of the pixel strictly interior to the contour, of index n*g.

The amplitudes of the contours are sorted in ascending order between the minimum and maximum values, so as to obtain for each index the final amplitude CAout:

$$CAout(n1*g+m0)=\text{sort}\{CA''(n1*g+m0)\}asc$$

with m0=0, 1, ..., (g−1).

Likewise, for a descending contour, if CA(in) corresponds to the real amplitude of a pixel at the position n interior to a contour, by performing the normalization operation, we obtain:

$$CA(n2) \leftarrow (CA(in)-CA(k2))/\text{contour\_contrast}$$

with contour_contrast=abs(CA(k2)−CA(i2)) and
with n2=(i2+1), ..., (k2−1), n2 corresponding to the position of a pixel interior to the relevant contour,
i2<k2, i2 and k2 being two integers correspond to the positions of the pixels having respectively a maximum and minimum amplitude and delimiting the contour,
CA(k2): minimum amplitude of the pixel delimiting the contour, of index i1,
CA(i2) designates the maximum amplitude of the pixel delimiting the contour, of index k1.

The width of the contour 1 is therefore equal to:

$$l=(k2-i2-1), \text{ in terms of number of pixels.}$$

The new amplitude CA' of the pixel of index n1 in the initial image, is equal to:

$$CA'(n2*g)=\text{gain}*(CA(n2)-CA(k2));$$

where:
gain designates the amplifying factor,
g the integer part of the gain,
n2*g designates new index in the processed image of the pixel of index n2 in the initial image.

The amplitude CA" of the sub-pixels which is added by the image processing is determined by the relation:

$$CA''(n2*g+m) = \begin{cases} CA(k2) & \text{if } CA'(n2*g) \geq m^*(CA(k2)-CA(i2)) \\ CA(i2) & \text{if } CA'(n2*g) \geq m^*(CA(k2)-CA(i2)) \end{cases}$$

with $m = 1, \ldots, (g-1)$.

The new amplitudes CA(n2) is shifted in such a way that it lies in the normalized deviation, that is to say that a modulo operation, in terms of phase, is applied:

$$CA''(n2*g)=\text{modulo}\{CA'(n2*g),(CA(i2)-CA(k2))\}+CA(k2),$$

where

CA"(n2*g) designates the normalized amplitude of the pixel strictly interior to the contour, of index n*g.

The amplitudes of the contours are sorted in ascending order between the minimum and maximum values, so as to obtain for each index the final amplitude CAout:

$$CAout(n2*g+m0)=\text{sort}\{CA"(n2*g+m0)\}des$$

with m0=0, 1, ..., (g−1).

We now refer to FIG. 6 which illustrates a numerical example of the embodiment described in FIG. 4.

In this example, a magnification of the image by a gain equal to 3 has been performed. The strict interior of the contour zone here comprises a single pixel, and two sub-pixels will be generated by the magnification.

On completion of the normalization, we are back at step 2 where the amplitudes CA(min), CA(n) and CA(max) are respectively the values 0; 0.65 and 1.

For step 3, the amplitude CA(n) is multiplied by the gain, that is to say 3. Its new value is equal to 1.95.

Next we proceed to step 5 where the value of m is equal to 1. As 1.95 is greater than 1, the value 1 is assigned to the amplitude CA(n)1 of the first sub-pixel.

Next we repeat the same operation with the value m=2. As 1.95 is less than 2, the value 0 is assigned to the amplitude CA(n)2 of the second sub-pixel.

During the ninth step (step 9) the Modulo operation is performed where the value 1, that is to say the deviation between CA(max) and CA(min), is deduced from the amplitude CA(n) of the contour pixel, so that its amplitude lies between 0 and 1.

Finally, during step 10, the set of normalized amplitudes obtained is sorted, here in increasing order.

FIG. 7 illustrates exactly the same type of processing, that is to say a magnification by a factor 3, but in the case where initially, the contour comprises two intermediate pixels, here having a normalized amplitude of 0.85 for CA(n) and of 0.35 for CA(n+1) respectively.

Two sub-pixels are added by pixels strictly interior to the contour zone, that is to say four sub-pixels in all in this example.

Additionally, a decreasing contour is considered here.

Steps 2 to 9 are identical to those described in FIG. 6, but repeated for each of the pixels of the contour zone CA(n) and CA(n+1).

Consequently, the sorting step 10 is performed on the whole set of the amplitudes obtained, here six ixels, and in decreasing order, given that a descending contour is considered here.

Figure 8:
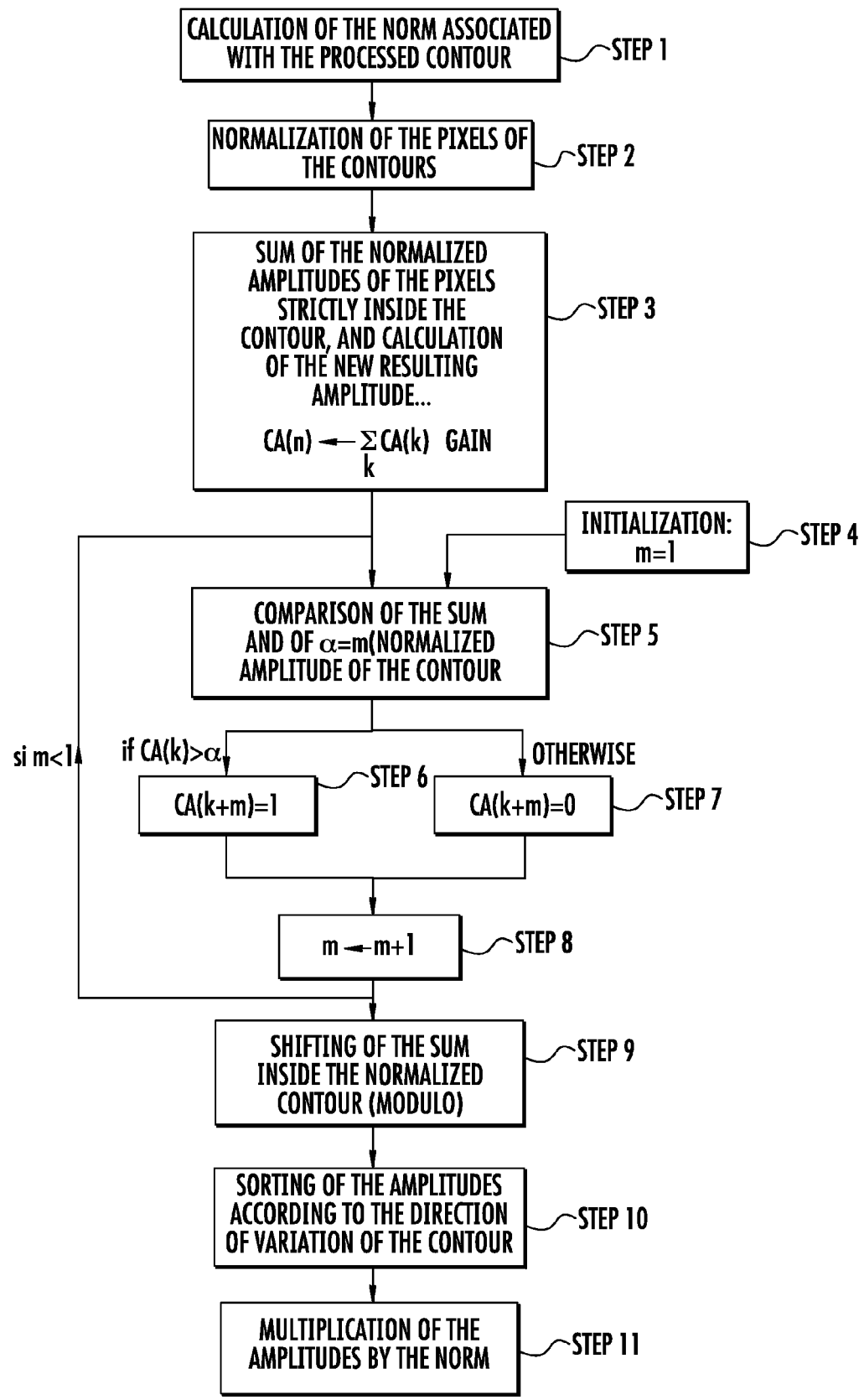
FIG. 8 illustrates another mode of implementation of a method according to the invention.

We now refer to FIG. 8, which illustrates another mode of implementation of a method especially suitable in the case of an increase, of a decrease or else of a change of resolution of the image.

In this embodiment, in the course of step 3, we do not consider each normalized amplitude of the pixels that are situated strictly interior to the contour zone, but we operate on the sum of these normalized amplitudes.

Consequently the comparison of step 5 is performed with this sum.

Furthermore, the criterion for stopping on completion of step 8 is not the comparison between the index m and the gain but between the index m and the variable l, which corresponds to the number of pixels strictly interior to the contour on completion of the processing.

Additionally, the modulo operation of step 9 is performed on the sum calculated during step 3.

We now refer to FIG. 9 which gives a numerical example of the embodiment represented in FIG. 8.

Here we consider a descending contour with two intermediate pixels having as normalized amplitudes 0.85 for CA(n) and 0.35 for CA(n+1) respectively.

Once more the processing carried out here is a magnification with a gain of 3, four sub-pixels are therefore generated for the contour, in addition to the two initial intermediate pixels.

Consequently, in the course of step 3, the sum of the amplitudes that are equal to 0.85 and 0.35, the whole multiplied by the gain of 3, is assigned as new amplitude to the pixel CA(n). The resulting amplitude is then equal to 3.6. Next, as already carried out previously, steps 4 to 8 are performed so long as the index m is strictly less than the number of pixels l interior to the contour zone.

In the course of step 9, the Modulo operation is performed on the amplitude calculated during step 3, so that the latter is once again normalized, that is to say equal to 0.6 in this case.

Finally, the sorting of the set of values obtained is performed in the course of step 10.

We now refer to FIG. 10 which illustrates a numerical example of the embodiment of FIG. 8, in the particular case where the gain is equal to 1.

This example corresponds to a processing of the image where neither the format nor the resolution of the latter is changed. For example, the processing may be that of the effects of blur of a digital image.

This numerical example corresponds to a descending contour comprising two intermediate pixels CA(n) and CA(n+1) having as normalized amplitudes the values of 0.85 and 0.35 respectively.

On completion of step 3, the amplitude assigned to CA(n) is equal to 1.2, that is to say the sum of the normalized amplitudes of CA(n) and CA(n+1) in step 2.

The comparison performed in the course of steps 4 to 8 makes it possible to assign the value 1 to the pixels having as amplitude CA(n+1).

Steps 9 and 10 are performed in the same manner as described previously.

Figure 11:
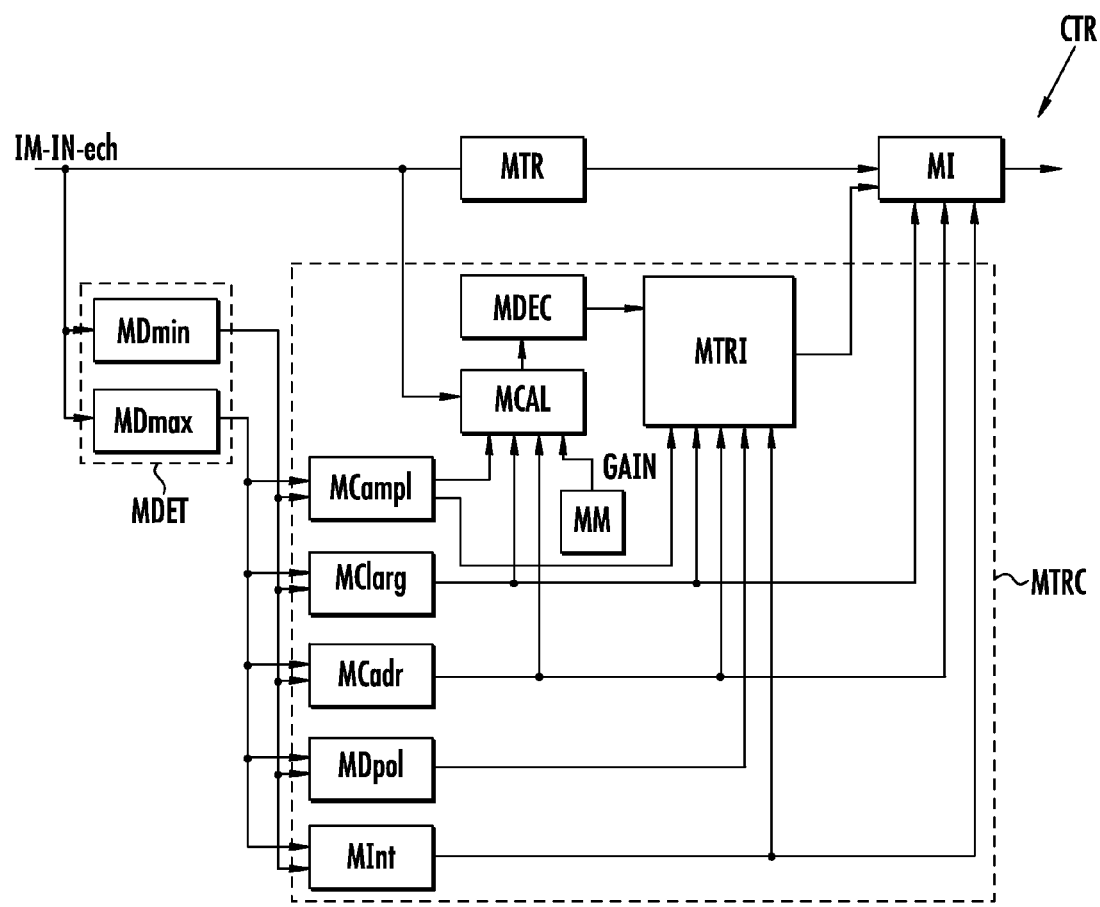
FIG. 11 illustrates more precisely an embodiment of a processing chain according to the invention.

We now refer to FIG. 11 which represents in greater detail an embodiment of the processing chain CTR able to implement a method according to the invention.

The contour processing synthesis means or circuitry MCTR comprise a first block MCampl able to calculate the amplitude of the contour considered on the basis of the minimum and maximum local amplitudes detected by the means MDET.

Means or circuitry MClarg are able for their part to calculate the size or width of the contour, that is to say the number of intermediate pixels interior to this contour.

Means or circuitry of addressing MCadr store for each contour its location within the input image IM-IN-ech.

Finally, means or circuitry MDpol are able to detect the polarity of the contour, that is to say whether the contour varies from a minimum amplitude to a maximum amplitude (rising contour) or a maximum amplitude to a minimum amplitude (descending contour).

The means or circuitry of processing of the contours MCTR also comprise means of storage MM able to store the value of the amplifying gain. Means or circuitry of calculation MCAL implement, on the basis of the data delivered by the means or circuitry MCampl, MClarg, MCadr and of the amplifying gain, a mode of implementation of the method according to the invention, for example steps 4 to 8 of the examples illustrated in FIG. 4 or 8.

The new normalized amplitudes are delivered to shifting means or circuitry MDEC able to perform the modulo operations of the amplitudes of contour pixels (step 6 of FIG. 5).

The set of amplitudes of the pixels of the contour are delivered to sorting means or circuitry MTRI which rank them as a function of the data delivered by the means MDpol, that is to say whether the contour is rising or descending.

The sorting means or circuitry MTRI also determine the final amplitudes by inverting the normalization operation.

The new synthesized amplitudes are delivered to the means or circuitry of insertion MI which as a function of the contour addresses delivered by the means or circuitry MCadr insert them into the processed image, according to a method well known to the person skilled in the art.

The means of processing of the contours may also comprise means or circuitry of interpolation MInt able to supervise the insertion of the contours performed by the means or circuitry MI in the case where the processing performed by the means or circuitry MTR comprises the application of a non-integer gain.

Additionally, the means or circuitry MCAL may perform the whole set of operations of an embodiment of the method according to the invention solely according to a preferred dimension of the image.

This preferred dimension is chosen as a function of the number of pixels interior to the contour processed.

Next, it is possible to determine the amplitude of the pixels that are added by the means or circuitry of processing MTR in the other dimensions of the image, directly on the basis of the amplitudes calculated for these pixels in the preferred dimension.

Specifically, for the pixels added by the processing means or circuitry, there exists a relation between the phases that are calculated for the preferred dimension and that of the other dimensions.

For example, for an image in two dimensions x and y, and for a processing implementing a gain, we obtain:

$$\phi'_{CO}(n_x, s_y) = \phi_{CA}(n_x) + s_y \cdot \phi_{COy}, \text{ with } \phi'_{CA}(n) = \text{gain} \cdot \phi_{CA}(n)$$

and $$s_y = (spp_y) \text{modulo}(\text{gain})$$

where:
$spp_y$: position of the pixel added by the processing within the contour,
$\phi_{COy}$: slope of the contour,
$\phi'_{CA}(n_x)$ represents the phase of the pixel at the position $n_x$ within the contour, for the initial image,
$\phi'_{CA}(n_x)$ represents the phase of the pixel at the position $n_x$ within the contour, for the processed image.

Figure 12:
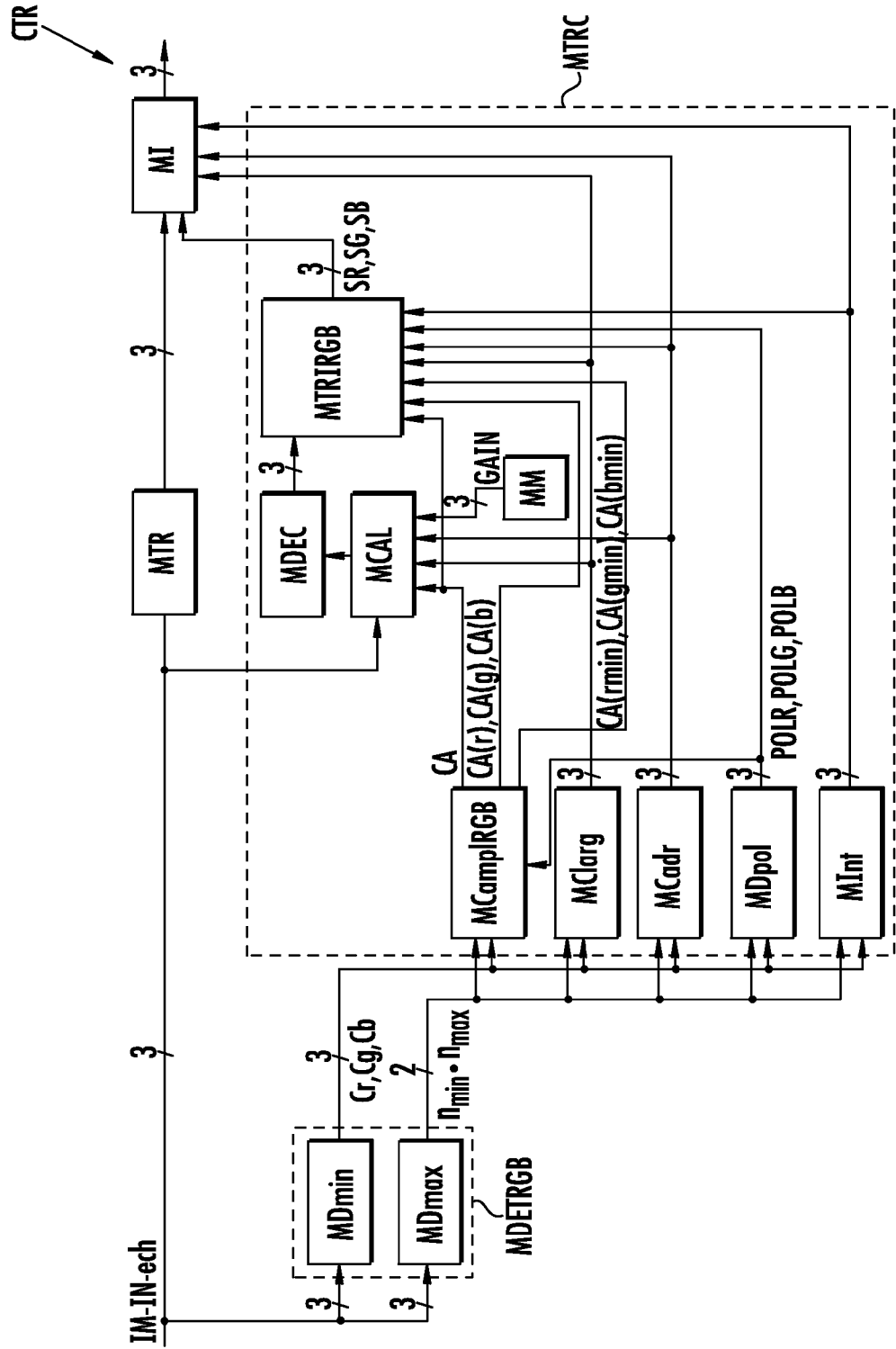
FIG. 12 illustrates an embodiment of a processing chain according to the invention, when the digital image is a colour image.

Reference is now made to FIG. 12, which represents an embodiment of the processing chain CTR in the processing of a digital colour image.

The embodiment illustrated in FIG. 12 is given merely by way of example, the processing chain CTR being able to be adapted to processing performed on the colour image.

Conventionally, within the frame for example of the processing of a television signal, the digital image is represented according to two chrominance components and a luminance component. The image is processed in this format so as to improve the quality of the luminance and chrominances. Next, the digital image is converted into the so-called RGB ("Red, Green, Blue") format before being projected onto the television screen.

However, the image obtained in the RGB format reveals numerous artefacts at the level of the colours of the image, such as:
a modification of the colours along the contours strong variations in contrast on either side of the contours
contrast errors in the pixels of the contour, these errors being related to a poor position of the contour owing to the quantization of the amplitude of the pixels when converting the image to the RGB format.

The processing chain CTR of which an embodiment is represented in FIG. 12, makes it possible to solve these problems. This processing chain has the advantage of preserving the significant phase information regarding the colours of the contour. This processing chain makes it possible to avoid the false variations in contrasts, and the btaining of visibly false colours at the level of the contours.

The processing chain presented in FIG. 12 borrows the elements of the processing chain illustrated in FIG. 11.

However, by virtue of the three RGB components of the new format of the colour image, the sampled image is transmitted via a bus comprising three transmission pathways, one for each component of the image.

Consequently, each module of the processing chain CTR performs the processing described previously for a black and white image, for each RGB component of the colour image.

The determining means or circuitry MDETRGB are adapted to the colour image. They deliver, on completion of the detection of the minima and maxima of the image, the contours for each component of the image.

These contours are referenced Cr, Cg, Cb, respectively for the red, green, and blue components. Each contour comprises the pixels belonging to the contour as well as their amplitude, for the component of the image considered.

Additionally, the determining means or circuitry MDETRGB deliver the ranks of the pixels $n_{min}$ and $n_{max}$ of the two pixels bounding the contour considered.

The means or circuitry for determining the direction of variation of the contours $MD_{pol}$ deliver three variables POLR, POLG and POLE. Each variable indicates the direction of variation of the contour (also called the polarity) respectively of the red component, of the green component and of the blue component of the image.

The means or circuitry for determining the amplitude of the contours of the image MCamplRGB receive the variables Cr, Cg and Cb, as well as the ranks of the pixels $n_{min}$ and $n_{max}$.

They also receive the polarities POLR, POLG, POLB of the contours of each component of the image.

On the basis of these different variables, the means or circuitry for determining the amplitude of the contours MCamplRGB calculate the amplitude of the contour CA of the digital colour image.

The means or circuitry MTRIRGB are sorting means or circuitry adapted for the colour images in particular of RGB type. They will be described more precisely hereinbelow.

The sorting means or circuitry MTRIRGB receive as input the variables delivered by the means or circuitry MInt, MDpol, MCadr, MClarg, as well as the amplitude CA determined by the means MCamplRGB.

The means or circuitry MTRIRGB also receive the amplitude of the contour pixels for each RGB component, these amplitudes having been calculated by the means or circuitry MCAL and then shifted by the shifting means or circuitry MDEC.

The means or circuitry MCamplRGB also deliver to the sorting means or circuitry MTRIRGB:
the amplitude of the contours for each component CA(r), CA(g) and CA(b), before the calculation performed by the means or circuitry MCAL,
the lower bound of the contour for each component CA(rmin), CA(gmin), CA(bmin).

The sorting means or circuitry MTRIRGB deliver to the insertion means or circuitry MI, the contours SR, SG and SB for each ROB component.

Figure 13:
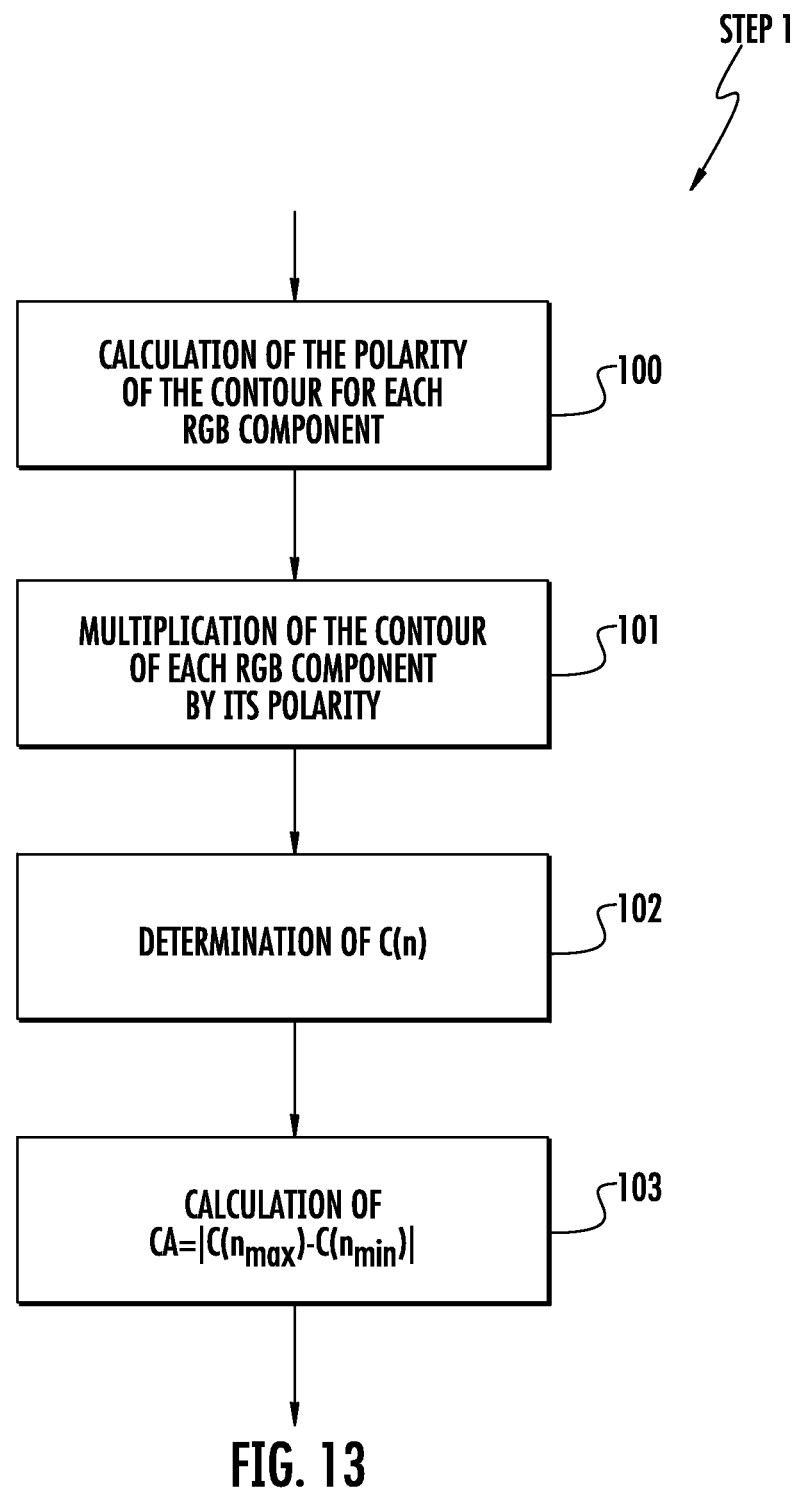
FIG. 13 illustrates more precisely the first step of a mode of implementing the method according to the invention, in the case of a colour image.

FIG. 13 illustrates a mode of implementing the method for determining the amplitude of the contour CA for a colour image of RGB type.

These steps are substituted for step 1 of FIGS. 4 and 8.

Firstly, the method, according to this mode of implementation, comprises a step of calculating the polarity of the contour POLR, POLG and POLB for each component red, green and blue (step 100). This step is carried out by the means or circuitry for determining the polarization MDpol.

For example, if the contour is upwards for the red component of the image, the variable POLR takes the value +1.

Next, in order to take account of the direction of variation of the contour, each contour Cr, Cg, Cb is multiplied by the corresponding polarity (step 101). Thus, the contour Cr is multiplied by the polarity POLR.

Next, a modified contour C(n) is determined which is equal to the sum of the contours Cr, Cg and Cb multiplied by the corresponding polarity (step 102).

Stated otherwise, it is possible to write for each pixel n:

$$C(n)=Cr(n) \cdot POLR+Cg(n) \cdot POLG+Cb(n) \cdot POLB$$

Finally, the amplitude of the contour CA is calculated by subtracting the value taken by C(n) at the pixel referenced $n_{min}$ from the value taken by C(n) at the pixel referenced $n_{max}$. The amplitude of the contour CA is equal to the absolute value of this difference (step 103).

The various aforesaid steps are illustrated by an example.

In this example, it is considered that the contour Cb is described by the following equation:

$$Cb(n) = (1 + \sin(n))/2, \quad n = -\frac{\pi}{2} \ldots \frac{\pi}{2},$$

where n corresponds to the rank of the pixel situated inside the contour.

Still within the same example, the contour on the green component of the image is represented by the following equation:

$$Cg(n)=1-Cb(n)$$

It is considered that the contour is null on the red component of the image:

$$Cr(n)=0$$

Figure 14:
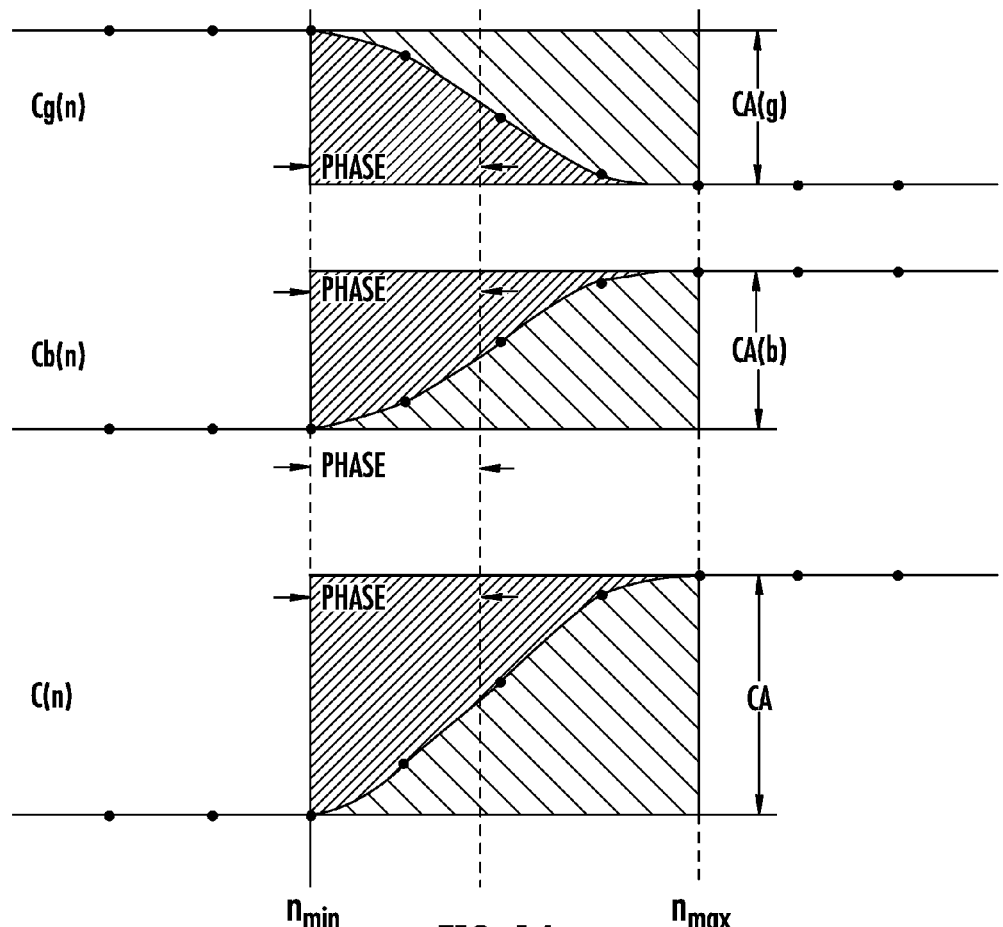
FIG. 14 represents an example of the contours of each component of a colour image of RGB type, according to the invention.

FIG. 14 represents these various contours for the green and blue components, respectively by the curves Cg(n) and Cb(n).

The black points on the curves represent the various pixels of the image. The phase of the contour corresponds to the discrepancy between the start of the contour (pixel of rank $n_{min}$) and a point situated on the contour.

The variables CA(g) and CA(b) represent the amplitude of the contour respectively on the green and blue components.

According to this example, the polarity of the contour on the blue component Cb(n) is equal to +1(POLB=+1). The polarity of the contour on the green component of the image is equal to −1(POLG=−1).

The value of the modified contour C(n) is equal in this example:

$$C(n) = Cb(n) * POLB + Cg(n) * POLG$$

-continued
$$= Cb(n)*1 + (1 - Cb(n))*(-1)$$
$$= 2*Cb(n) - 1$$

The curve C(n) represented in FIG. 14 illustrates the variation of the modified contour.

Finally, the amplitude of the contour CA is calculated according to the following expression:

$$CA=|C(n_{max})-C(n_{min})|=|2(Cb(n_{max})-Cb(n_{min}))|.$$

Another possibility would be to calculate C(n) by considering the sum of the absolute values of the contours on each RGB component:

$$C(n)=|Cb(n)|+|Cg(n)|+|Cr(n)|.$$

Figure 15:
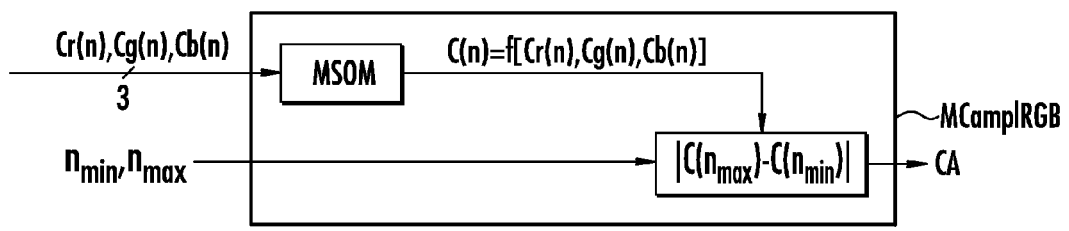
FIGS. 15 and 16 illustrate more particularly circuitry to determine the amplitude of a contour of a colour image, according to the invention.

FIG. 15 illustrates an embodiment of the means or circuitry for determining the amplitude MCamplRGB in such a way as to implement the various steps described hereinabove.

The means or circuitry for determining the amplitude MCamplRGB comprises means or circuitry for determining the modified contour MSOM. The latter are able to receive the components Cr(n), Cg(n) and Cb(n) and to deliver the modified contour C(n) which is a function f of the aforesaid RGB components.

$$C(n)=[Cr(n),Cg(n),Cb(n)].$$

The means or circuitry MCamplRGB also comprise calculation means or circuitry MDIF able to calculate $|C(n_{max})-C(n_{min})|$.

The calculation means or circuitry MDIF delivers the amplitude of the contour CA.

Figure 16:
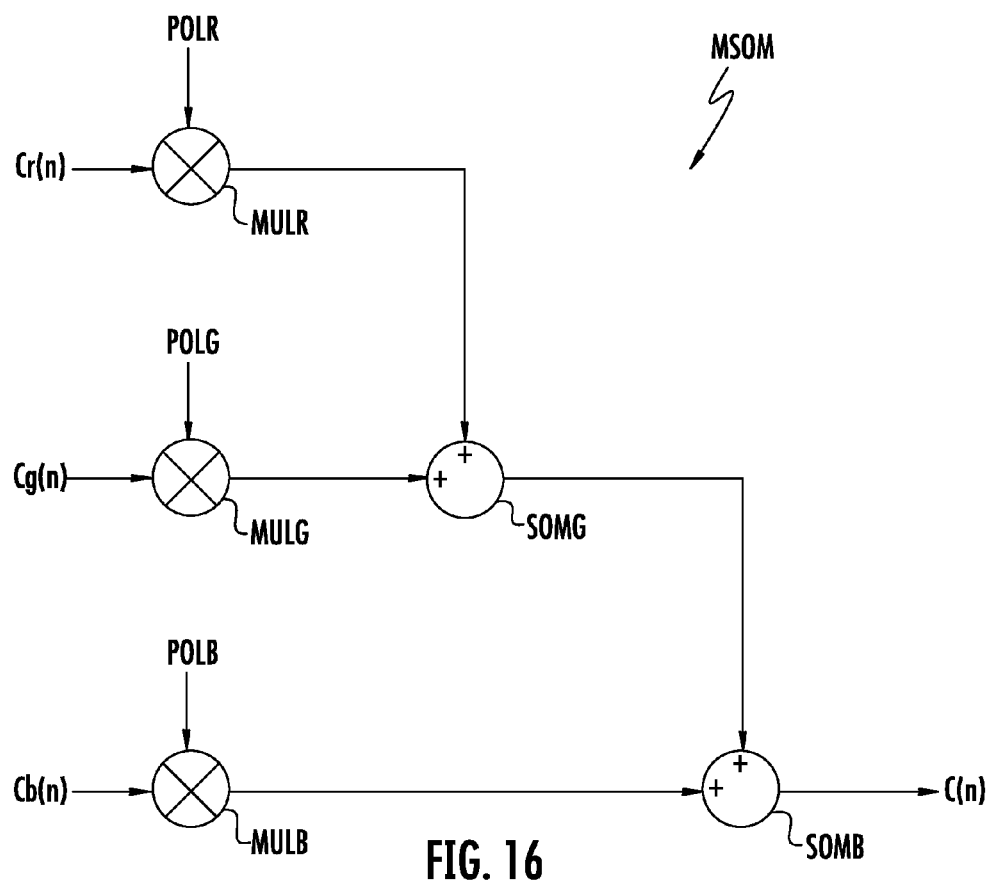

More precisely, as illustrated in FIG. 16, the means or circuitry MSOM comprises a multiplier MULR able to multiply the component Cr(n) and the polarity POLR. They also comprise another multiplier MULG for multiplying the component Cg(n) with the polarity POLG.

An adder SOMG adds the results arising from the two multiplications performed by the multipliers MULG and MULR.

Finally, the means or circuitry MSOM comprises a third multiplier MULB for multiplying the component Cb(n) with the polarity POLB.

An adder SOMB sums the result delivered by the adder SOMG and the result delivered by the multiplier MULB.

Finally, the adder SOMB delivers the modified contour C(n).

Figure 17:
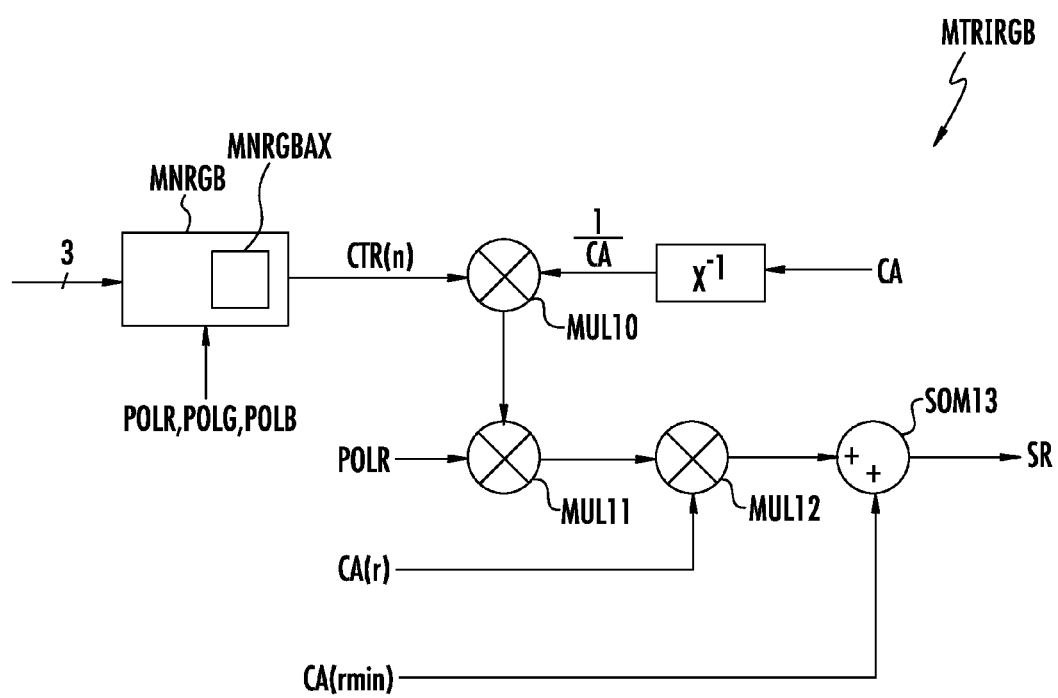
FIG. 17 illustrates more particularly a circuit for a processing chain according to the invention, this circuit being able to intervene on the contours of a colour image, prior to their reinsertion into the image.

FIG. 17 illustrates an embodiment of the means or circuitry MTRIRGB. For simplifying purposes, only the means or circuitry intended for formulating the contour to be inserted of the red component SR are represented. These same means or circuits are repeated for the contours to be inserted SB and SG respectively of the blue and green components.

Means or circuitry MNRGB orders the pixels of the contours of each component according to the contour polarity on the component considered (step 10, FIG. 4 or 8).

Next an intermediate contour CTR(n) is formulated by auxiliary means or circuitry MNRGBAX. This intermediate contour CTR(n) is formulated as a function of the contours on each component which are delivered by the shifting means or circuitry MDEC. At this juncture, the values taken by CTR(n) are still normalized.

An inverter $X^{-1}$ receives the amplitude of the contour CA. As may be seen in FIG. 14, it is recalled that:

$$CA = CA(\max) - CA(\min)$$
$$= CA(r\max) - CA(r\min) + CA(g\max) -$$
$$CA(g\min) + CA(b\max) - CA(b\min)$$
$$= CA(r) + CA(g) + CA(b).$$

The sorting means or circuitry MTRIRGB furthermore comprises:
a multiplier MUL10 able to multiply the intermediate contour CTR(n) by the inverse of the amplitude of the contour 1/CA,
another multiplier MUL11 able to multiply the polarity POLR of the contour on the component considered (here red) by the result delivered by the multiplier MUL10, namely CTR(n)/CA, another multiplier MUL12 able to multiply the amplitude CA(r) of the contour for the component considered, here red, by the result delivered by the multiplier MUL11, namely POLR*CTR(n)/CA, and
a summator SOM13 able to add the result delivered by the multiplier MUL12 to the lower bound of the contour on the red component CA(rmin).

The multipliers MUL10, MUL11 and MUL12 and the summator SOM13 make it possible to perform step 11 (FIG. 4 or 8).

Finally this yields:

$$SR = \frac{CA(r)}{CA} * POLR * CTR(n) + CA(r\min).$$

Likewise, for the green and blue components yields:

$$SG = \frac{CA(g)}{CA} * POLG * CTR(n) + CA(g\min),$$
and
$$SB = \frac{CA(b)}{CA} * POLB * CTR(n) + CA(b\min).$$

The contours SR, SG and SB comprise the pixels of contours respectively of the red, green and blue components, these pixels having a real and no longer normalized final amplitude.

The invention claimed is:

1. A method of processing a digital image comprising at least one contour zone, the method comprising:
performing a contour zone sharpness processing comprising
converting cues related to a level of pixels of the at least one contour zone into initial main cues lying between zero and a main value dependent on an amplitude of the at least one contour zone,
performing a sharpness sub-processing on the initial main cues to obtain final main cues, and
converting the final main cues into final cues.

2. A method according to claim 1, wherein the sharpness sub-processing comprises, for each pixel in the at least one contour zone, determining an intermediate cue and subtracting the intermediate cue from a maximum initial main cue to obtain the final main cue.

3. A method according to claim 1, wherein the digital image comprises a color image comprising a red component, a green component, and a blue component, each of the red, green, and blue components having a respective contour zone; wherein the amplitude of the at least one contour zone is determined based upon the respective contour zone of each of the red, green, and the blue components; and wherein the contour zone sharpness processing is performed on each of the red, green, and blue components.

4. A method according to claim 1, further comprising displaying the digital image on a display screen based upon the final cues.

5. A method according to claim 3, wherein the amplitude of the at least one contour zone is also determined based upon a direction of variation of the contour zones of each of the red, green, and blue components.

6. A method according claim 5 wherein, determining of the amplitude of the at least one contour zone comprises:
multiplying the contour zone of each of the red, green, and blue components by the respective direction of variation;
adding the multiplied contour zone of each of the red, green, and blue components to thereby obtain a modified contour zone;
calculating the amplitude of the at least one contour zone by subtracting values of the cues related to the level of pixels of the at least one contour zone from values of cues of the modified contour zone.

7. A device for processing a digital image comprising at least one contour zone, comprising:
contour zone sharpness processing circuitry to perform a contour zone sharpness processing and comprising
first conversion circuitry to convert cues related to a level of pixels of the at least one contour zone into initial main cues lying between zero and a main value dependent on an amplitude of the at least one contour zone,
sharpness sub-processing circuitry to perform a sharpness processing on the initial main cues to obtain final main cues, and
second conversion circuitry to convert the final main cues into final cues.

8. A device according to claim 7, wherein the sharpness sub-processing circuitry comprises:
determining circuitry to determine, for each pixel in the at least one contour zone, an intermediate cue; and
subtraction circuitry to subtract the intermediate cue from a maximum initial main cue to obtain the final main cue.

9. A device according to claim 8, wherein the digital image comprises a color image comprising a red component, a green component, and a blue component, each of the red, green, and blue components having a respective contour zone; wherein the first conversion circuitry comprises amplitude determination circuitry to determine an amplitude of the at least one contour zone based upon the contour zone of each of the red, green, and the blue components; and wherein the contour zone sharpness processing is performed on each of the red, green, and blue components.

10. A device according to claim 9, wherein the amplitude determination circuitry also determines the amplitude of the at least one contour zone based upon a direction of variation of the contour zones of each of the red, green, and blue components.

11. A device according to claim 10, wherein the sharpness sub-processing comprises, for each pixel in the at least one contour zone, determining an intermediate cue and subtracting the intermediate cue from a maximum initial main cue to obtain the final main cue.

12. A device according to claim 11, wherein the amplitude of the at least one contour zone is also determined based upon a direction of variation of the contour zones of each of the red, green, and blue components.

13. A device according to claim 10, wherein the digital image comprises a color image comprising a red component, a green component, and a blue component, each of the red, green, and blue components having a respective contour zone; wherein the amplitude of the at least one contour zone is determined based upon the contour zone of each of the red, green, and the blue components; and wherein the contour zone sharpness processing is performed on each of the red, green, and blue components.

14. A device according to claim 13 wherein, determining of the amplitude of the at least one contour zone comprises:

multiplying the contour zone of each of the red, green, and blue components by the respective direction of variation;

adding the multiplied contour zone of each of the red, green, and blue components to thereby obtain a modified contour zone;

calculating the amplitude of the at least one contour zone by subtracting values of the cues related to the level of pixels of the at least one contour zone from values of cues of the modified contour zone.

15. A device for processing a digital image comprising at least one contour zone, the device comprising:

circuitry to perform a contour zone sharpness processing by at least converting cues related to a level of pixels of the at least one contour zone into initial main cues lying between zero and a main value dependent on an amplitude of the at least one contour zone, performing a sharpness sub-processing on the initial main cues to obtain final main cues, and converting the final main cues into final cues.

* * * * *